United States Patent [19]

Rees

[11] B 3,925,530

[45] Dec. 9, 1975

[54] RELEASE COATING FOR MOLDS

[75] Inventor: Robert L. Rees, Bartlesville, Okla.

[73] Assignee: Phillips Petroleum Company, Bartlesville, Okla.

[22] Filed: Dec. 4, 1972

[21] Appl. No.: 312,139

[44] Published under the Trial Voluntary Protest Program on January 28, 1975 as document no. B 312,139.

Related U.S. Application Data

[63] Continuation of Ser. No. 113,607, Feb. 8, 1971, abandoned.

[52] U.S. Cl. ............... 264/297; 117/5.1; 117/5.3; 249/115; 260/79.1; 264/310; 264/338
[51] Int. Cl.² ............................................. B29C 1/04
[58] Field of Search .......... 264/337, 338, 297, 310; 117/5.1, 5.3; 260/79.1; 249/115, 134

[56] References Cited
UNITED STATES PATENTS

| | | | |
|---|---|---|---|
| 2,488,446 | 11/1949 | Swiss | 117/5.3 X |
| 3,354,129 | 11/1967 | Edmonds | 260/79.1 |
| 3,487,454 | 12/1969 | Oates | 260/900 |
| 3,492,125 | 1/1970 | Ray | 99/1 |

OTHER PUBLICATIONS

Modern Plastics Encyclopedia, Oct. 1970, Vol. 47, No. 10A, TP 986. AZM5, pp. 208 & 213.

*Primary Examiner*—Robert F. White
*Assistant Examiner*—Thomas P. Pavelko

[57] ABSTRACT

A method of molding polymeric materials, such as olefin polymers, in a mold which has a release coating of 50–90 parts by weight polyphenylene sulfide, up to 10 parts by weight polytetrafluorethylene and a filler in an amount of 10–50 parts by weight. The release coating can be utilized to form a plurality of articles without reapplication of the coating. The coating may be applied to the mold as a solution of a volatile solvent or in the melted state.

10 Claims, No Drawings

RELEASE COATING FOR MOLDS

This is a continuation of application Ser. No. 113,607 filed Feb. 8, 1971, now abandoned.

This invention relates to release coatings for molds.

In one of its more specific aspects, this invention relates to a composition which, when applied to the inner surfaces of a mold, permits proper release of the molded object from the mold.

Obtaining proper mold release in molding is frequently difficult. Such difficulties are frequently increased by the nature of the molding process and the properties of the material molded. For example, obtaining proper mold release in rotational molding for high density polyethylene is quite difficult. Such release agents as are applied to the internal surface of molds are only semipermanent, are difficult to apply and are expensive. Frequently, such release agents cause the part to release prematurely in the cooling cycle with the result that the molded article is misshapened. The method and apparatus of this invention eliminate these problems.

This invention involves a composition for coating molds which comprises polyphenylene sulfide and a filler or processing aid selected from the group consisting of titanium oxide, aluminum oxide, iron oxide, clay and fluoroolefin polymers.

The apparatus of this invention comprises a mold, the internal surface of the mold being substantially covered with polyphenylene sulfide.

For the purpose of this discussion the term polyphenylene sulfide will be considered as embodying that group of compounds disclosed in U.S. Pat. No. 3,354,129, Edmonds et al.

The method and apparatus of this invention are applicable in the molding of any material moldable at a temperature less than that temperature at which the polyphenylene sulfide coating becomes inoperable as a satisfactory coating. For illustration purposes, the method will be illustrated in terms of rotational molding of a polymeric material such as a polyolefin, for example, polyethylene.

The mold release coating of this invention will be comprised of polyphenylene sulfide and, preferably, a filler. Preferably, the filler will be selected from the group consisting of titanium oxide, aluminum oxide, iron oxide, clay and certain polymeric substances such as polyethylene and polypropylene. Such fillers will be incorporated in the mold release coating in an amount from about 10 to about 50 parts by weight with the polyphenylene sulfide comprising from about 50 to about 90 parts by weight. Up to about 10 parts by weight of polytetrafluoroethylene can also be included as a processing aid.

The coating can be employed with any material to which it will adhere including steel, aluminum, nickel, brass, wood and the like. Such materials are surface-prepared in the normal manner, this involving the usual cleaning procedures to insure adherence between the mold surface and the polyphenylene sulfide.

The composition can be prepared by dry mixing or by melting one of the components and blending the others therein to form a homogeneous mixture.

The coating is applied to the mold surface in any suitable manner. For example, it can be introduced onto the surface in the melted state or it can be sprayed on the surface in the form of a suspension in a volatile solvent such as ethylene glycol.

The coating can be applied in any number of coats, a plurality of applications being preferred to insure surface coverage, with two coats usually being sufficient. The coatings can be of identical or different compositions. The coatings can be of like or different thicknesses with a total thickness of about 1 mil usually being sufficient. After application of the coating and substantial evaporation of the carrier, the coating is cured at a temperature of about 700° F. for a period of about 30 minutes to 1 hour.

The application of the method of this invention is illustrated in the following example. An aluminum mold was degreased with a solvent and sand blasted to further clean the surface.

A first application of the coating was made in the form of an ethylene glycol suspension, the composition of the coating being comprised of 3 parts by weight polyphenylene sulfide and 1 part by weight of titanium oxide. The coating was allowed to dry and was cured at 700° F. for 30 minutes, its thickness being 1 mil. A second coating was then applied in the form of an ethylene glycol suspension, the composition of the coating being comprised of 3 parts by weight polyphenylene sulfide, 1 part by weight titanium oxide and 0.3 parts by weight polytetrafluoroethylene. After drying, the curing procedure was repeated.

The mold so produced was employed to produce over 300 articles molded from high density polyethylene, rotational molding being employed, with proper release being obtained in all instances and all coatings being satisfactory, with the coating of the mold showing no wear. The mold can reasonably be expected to be serviceable for ten times that production.

It will be evident that various modifications can be made to the method of this invention. Such, however, are considered as being within the scope of the invention.

What is claimed is:

1. A method of molding which comprises:
   a. applying a mold release coating composition consisting essentially of polyphenylene sulfide in an amount within the range of from about 50 to about 90 parts by weight, polytetrafluoroethylene in an amount up to 10 parts by weight and a filler in an amount within the range of from about 10 to about 50 parts by weight said filler selected from the group consisting of titanium oxide, aluminum oxide, iron oxide and clay to the inner surface of a mold;
   b. curing said coating;
   c. introducing into said mold and into contact with the cured coating a polymeric composition moldable at a temperature less than that temperature at which the mold release coating composition becomes inoperable as a satisfactory coating;
   d. molding said moldable polymeric composition;
   e. removing said moldable polymeric composition from said mold as a molded object; and
   f. repeating steps (c), (d), and (e) to produce a multiplicity of molded objects.

2. The method of claim 1 in which filler is titanium oxide.

3. The method of claim 1 in which said coating is applied to said mold in a volatile solvent.

4. The method of claim 2 in which said coating is applied to said mold in the melted state.

5. The method of claim 1 in which said coating is applied to said mold in a plurality of applications.

6. The method of claim 2 in which said coating is cured at a temperature of about 700°F. for a period of from about 30 minutes to about 1 hour.

7. The method of claim 4 in which said coating is applied in the form of an ethylene glycol suspension.

8. The method of claim 2 in which said coating consists essentially of 3 parts by weight polyphenylene sulfide, 1 part by weight titanium oxide and 0.3 parts by weight polytetrafluoroethylene.

9. The method of claim 8 in which said coating is applied over a curved undercoating and said coating is cured after drying.

10. The method of claim 1 in which the moldable polymeric composition is polyolefin.

* * * * *

UNITED STATES PATENT AND TRADEMARK OFFICE
CERTIFICATE OF CORRECTION

PATENT NO : 3,925,530

DATED : December 9, 1975

INVENTOR(S) : Robert L. Rees

It is certified that error appears in the above-identified patent and that said Letters Patent are hereby corrected as shown below:

Column 4, line 4, "curved" should be "cured".

Signed and Sealed this thirtieth Day of March 1976

[SEAL]

Attest:

RUTH C. MASON
*Attesting Officer*

C. MARSHALL DANN
*Commissioner of Patents and Trademarks*